Aug. 4, 1936.   F. B. STEARNS   2,049,630
MEANS AND METHOD OF EFFECTING ENGINE CYLINDER TURBULENCE
Filed Oct. 11, 1932   2 Sheets-Sheet 1
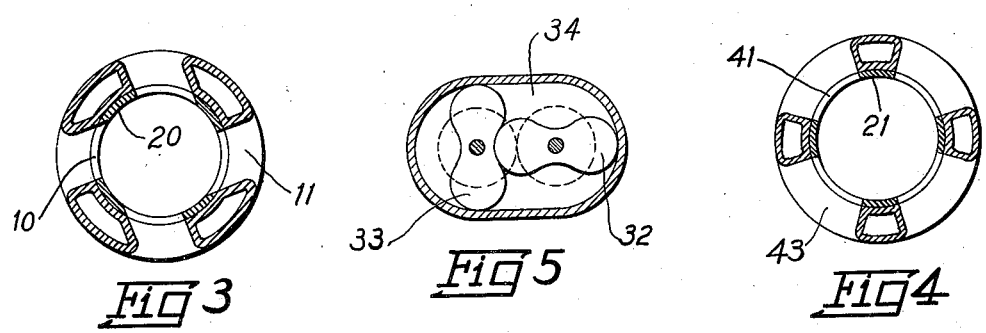
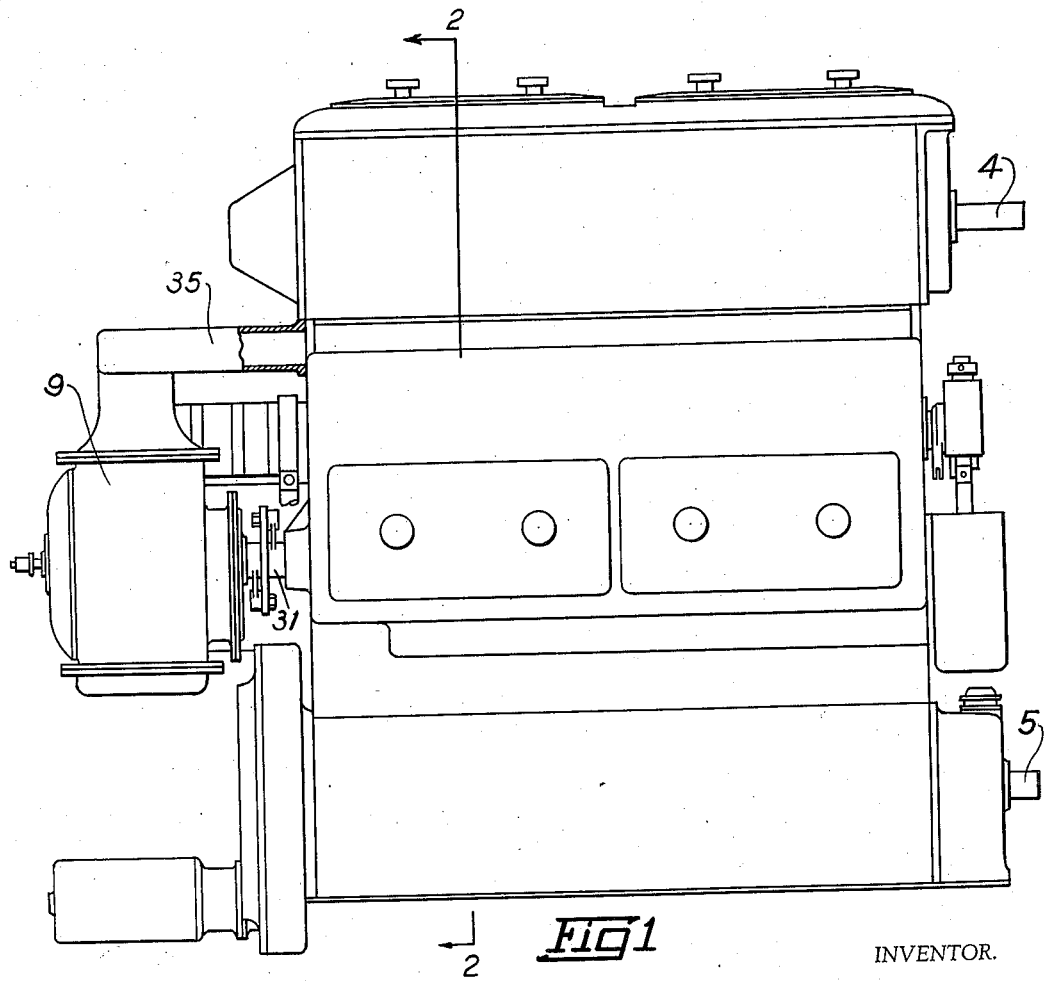
INVENTOR.
Frank Ballou Stearns.
BY
His ATTORNEYS Patented Aug. 4, 1936

2,049,630

UNITED STATES PATENT OFFICE 2,049,630

MEANS AND METHOD OF EFFECTING ENGINE CYLINDER TURBULENCE

Frank Ballou Stearns, Shaker Heights, Ohio

Application October 11, 1932, Serial No. 637,274

8 Claims. (Cl. 123—32)

This invention relates to internal combustion engines, and more particularly to means and methods for effecting and controlling turbulence of the air and/or gaseous mixtures in the cylinders of engines.

The efficiency of an internal combustion engine is directly related to the degree to which the air and fuel composing the explosive charge are intimately mixed at the time of combustion. Particularly is this true in engines of the Diesel type wherein air is compressed in the cylinder and liquid fuel is injected into the air under pressure; and to effect a thorough mixing of the air and fuel to promote rapid and complete combustion, it is desirable to subject the air to a high degree of turbulence at the time of injecting the fuel into it.

I have developed a method whereby a relatively great turbulence of the air and/or gaseous mixture is created by utilizing a novel form and disposition of engine cylinder and in the case of Diesel type engines, effecting synchronization of the engine piston cycle, with air charging periods, during which periods air is supplied to the cylinder in synchronized impulses.

The cylinder is scavenged of burned gas and a fresh charge of air is supplied at a relatively low pressure, and when the cylinder is at a relatively low pressure, such as a sub-atmospheric pressure, which aids the scavenging process. This fresh air is turbulently compressed and when fuel firing temperature is attained, it is thoroughly mixed with comminuted fuel oil causing rapid expansion of the ensuing gas.

It is an object of my invention therefore to provide an internal combustion engine of increased efficiency, resulting from improved fluid turbulence in the cylinder.

Another object of my invention is to provide an internal combustion engine adapted to develop a relatively great turbulence of the air and/or gaseous mixture supplied to the cylinders.

Another object of my invention is to provide an internal combustion engine wherein the admission of air and/or gaseous mixture into the cylinder is effected in a manner to impart a cyclonic action thereto.

Another object of my invention is to provide an internal combustion engine wherein the cylinder combustion chamber is formed to impart turbulent movement to the compressed air and/or gaseous mixture.

Another object of my invention is to provide an internal combustion engine adapted to effect an improved degree of intimate mixing of turbulent compressed air and comminuted liquid fuel and/or gaseous mixture.

These and other objects of my invention will become more apparent from a consideration of the following description taken in connection with the accompanying drawings, in which:

Fig. 1 is an elevational view of an internal combustion engine embodying my invention;

Fig. 3 is a section taken along the lines 3—3 of Fig. 2;

Fig. 4 is a section taken along the lines 4—4 of Fig. 2; and

Fig. 5 is a transverse sectional view of an impeller type blower which I may employ in connection with the engine illustrated in Fig. 1.

Figure 2:
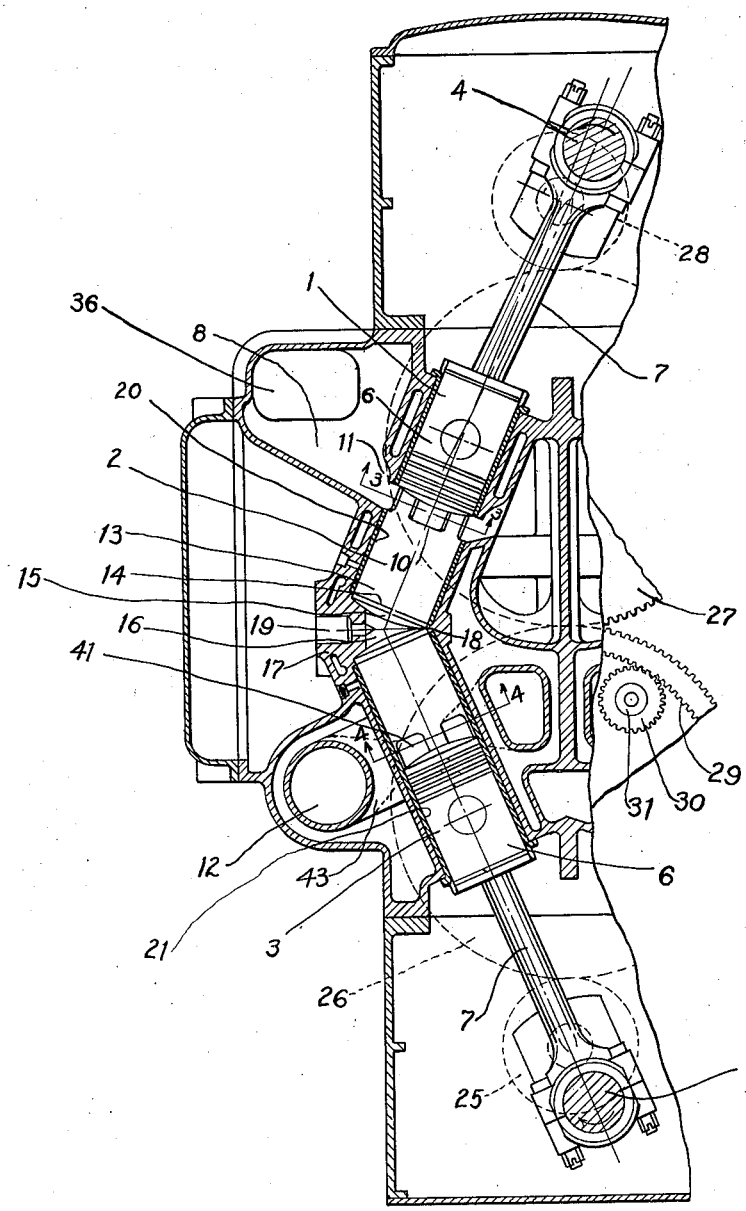
Fig. 2 is a fragmentary sectional view taken along the line 2—2 of Fig. 1.

Referring to the drawings, a generally V-shaped cylinder indicated at 1 comprises an upper section 2 and a lower section 3, the apex of the V being disposed laterally and the sections 2 and 3 diverging respectively upwardly and downwardly at an angle dependent upon the positioning of an upper crank shaft 4 and a lower crank shaft 5. The sections of the cylinder have pistons 6 reciprocatingly disposed therein which are connected to the crank shafts 4 and 5 by connecting rods 7.

The upper section 2 of the cylinder is substantially surrounded by a large air chamber 8 supplied with air from a blower or rotor 9 to be later described. The upper section 2 is provided with a plurality of radially spaced intake ports 10, the ports 10 being connected to the air supply chamber 8 by ducts 11 which are disposed generally tangentially and upwardly of the section walls. Thus a body of air entering the cylinder through the intake ports 10 from the air supply chamber 8 would have a cyclonic and longitudinal action towards the lower section 3 imparted thereto. The position of ducts 11 relative to the walls of section 2 is most clearly illustrated in Fig. 3.

The lower cylinder section 3 is provided with a plurality of radially spaced exhaust ports 41 connected to a relatively large manifold 12 encircling the exhaust ports by ducts 43, the said ducts progressively increasing in cross sectional area from the exhaust ports 41 to the manifold. Thus exhaust gases entering the manifold through the exhaust ports 41 would be permitted to rapidly expand and due to the consequent drop in pressure will accelerate the exhaustion of gases from the cylinder to a considerable degree.

The upper and lower cylinder sections are generaly similar with the exception that the intake ports of section 2 are connected to the air supply by ducts disposed tangentially of the cylinder walls whereas the exhaust ports are connected to the exhaust manifold by ducts which extend radially from the cylinder walls. The sections are provided with a bored portion 13 extending a major portion of the length, a relatively small co-axially bored portion 14 substantially the diameter of the piston and a coaxial convexed portion 15 conforming generally to the crown of the piston.

The convexly bored portions 15 of the cylinder have a combustion chamber 16 formed there between which is provided with a relatively thick wall 17 and thence progressively decreases in cross sectional area to a point diametrically opposite as indicated at 18.

A fuel injection nozzle 19, rigidly mounted in the wall 17 of the combustion chamber, is adapted to periodically inject comminuted fuel oil under relatively high pressure into the combustion chamber, the injection of the fuel oil being synchronized with the piston cycle in a manner to be hereinafter described.

I preferably employ liners 20 and 21 in the upper and lower cylinder sections respectively which have substantially the same coefficient of expansion as the engine block for various advantages well understood in the art. As will be noted in referring to Fig. 3, the upper cylinder liner is provided with spaced intake ports generally conforming to the tangential curve of the intake port 10 and complementary thereto. The lower section liner 21 is provided with radial ports aligned with the exhaust ports 41 provided in the lower section 3. The liner ports will thus offer a minimum of frictional resistance to the ingress and egress of fluids passing therethrough.

The upper and lower crank shafts rotate at the same speed, and power may be taken from either of the crank shafts, these being linked by a train of gears comprising a pinion 25 co-axial with and rigidly secured to the lower crank shaft 5 meshing with a gear 26 which in turn engages a gear 27 meshing with a pinion 28 rigidly secured to and coaxially aligned with the upper crank shaft 4. The gear 26 is provided with internal teeth generally indicated at 29 whereby it may rotate a pinion 30 integral with a shaft 31 which through suitable gearing is adapted to drive the impeller blades 32 and 33 secured within the housing of the blower 9.

Although it is understood that any suitable type rotor or blower may be employed I preferably use the impeller type as is most clearly illustrated in Fig. 5 wherein the impeller blades 32 and 33 rotate substantially in air tight relation with each other and the casing walls and thereby compress air which is trapped in the space generally indicated at 34 to a peak pressure, the air pressure and volume being in the form of an undulating stream forced from the blower by the rotation of the impeller blades in a manner well understood. The blower 9 forces the air through a conduit 35 and thence into the air chamber 8 by a port 36.

The point at which it is desired to have the peak pressure or volume of air be available in the air chamber 8 relative to the uncovering of the intake ports by the pistons can be controlled through the selection of proper gear ratio and the number and speed of the impeller blades relative to the engine speed. I preferably have air admitted to the cylinder at the peak pressure of the surging or undulating air stream.

Upon uncovering the exhaust ports the burned gases will rapidly exhaust through the relatively large manifold 12 which action will be accelerated by the progressively increasing ducts leading thereto until the remaining gases are at a pressure substantially below atmospheric pressure. Air will then be admitted at the opposite end of the cylinder at peak pressure and of sufficient volume to scavenge the remaining gases and to completely fill the portion of the cylinder intermediate the pistons. A cyclonic and longitudinal impetus towards the combustion chamber 16 will be imparted to the incoming body of air which will effect a great turbulence thereof augmented by the kinetic energy possessed by the body of air due to its being admitted to the cylinder at a high velocity.

The exhaust and intake ports will then be successively closed by the pistons sweeping over them and the swirling charge of confined air will be compressively forced into the combustion chamber 16 whereupon it will be forced divergently laterally from point 18 toward the injection nozzle 19 mounted in wall 17 of the combustion chamber. At substantially the completion of the compression stroke the air will have been sufficiently compressed to have attained fuel firing temperature and a charge of fuel oil under high pressure synchronized with the piston cycle will be injected into the combustion chamber and the ensuing expansion of gases therein forces the pistons in opposed directions on the working stroke.

I preferably have the upper piston lag about 1.8° behind the lower piston whereby the exhaust ports will be successively opened and closed slightly in advance of the intake ports.

It is very desirable for efficient operation that an intimate mixture of the compressed air and comminuted fuel oil be attained and this is effected through the relatively great turbulence imparted to the air and the lateral squeezing action exerted thereon in the combustion chamber.

Although I have shown and described an embodiment of my invention I contemplate that numerous and extensive departures may be made therefrom without departing from the spirit and scope of my invention, and of the appended claims.

Having thus described my invention, what I claim is:

1. The method of turbulently successively charging the cylinders of a multi-cylinder engine preparatory to injecting fuel thereinto, which engine is of the type provided with a blower or the like supplying air to a plurality of cylinders all disposed to receive air from a common large volume air supply chamber and each cylinder of which is provided with a pair of oppositely cyclically moving pistons which includes causing the air in the common supply chamber to undulate at all parts thereof simultaneously at a frequency which is a multiple of the frequency of the piston cycle, suddenly exhausting a cylinder at one end, then suddenly admitting a large volume of the air from the supply chamber to the cylinders successively and at a peak of the undulating pressure, at the other end of the cylinder and between the pistons and in a generally tangential direction to impart a cyclonic motion thereto while moving toward the exhaust end of the cylinder, then successively discontinuing the exhaustion and admission, then compressing the air in the cylinder between the pistons and finally forcing it laterally toward one wall of the cylinder at minimum volume.

2. The method of turbulently successively charging the cylinders of a multi-cylinder engine preparatory to injecting fuel thereinto, the engine being of the type provided with a blower or the like supplying air to a plurality of cylinders all disposed to receive air from a common large volume air supply chamber and each cylinder of which is provided with a pair of oppositely cyclically moving pistons, which includes causing the air in the chamber to undulate at all parts thereof simultaneously and at a frequency which is a multiple of the frequency of a piston cycle, suddenly exhausting a cylinder at one end, then suddenly admitting air of large volume from the undulating supply stream at a peak of the undulating pressure, at the other end of the cylinder and between the pistons, then successively discontinuing the exhaustion and admission and compressing the air in the cylinder between the pistons.

3. The method of turbulently successively charging the cylinders of a multi-cylinder engine preparatory to the injection of fuel thereinto, which engine is provided with a blower or the like supplying air to a plurality of cylinders all disposed to receive air from a common large volume air supply chamber and each cylinder of which is provided with a pair of oppositely cyclically moving pistons which includes causing the air in the supply chamber to undulate at all parts thereof simultaneously at a frequency which is a multiple of the frequency of the piston cycle, suddenly exhausting a cylinder at one end, then suddenly admitting a large volume of the air from the supply to the cylinders successively and at a peak of the undulating pressure, at the other end of the cylinder and between the pistons and in a generally tangential direction to impart a cyclonic motion thereto while moving toward the exhaust end of the cylinder, then successively discontinuing the exhaustion and admission, then compressing the air in the cylinder between the pistons and finally forcing it laterally toward one wall of the cylinder at minimum volume.

4. The method of turbulently successively charging the cylinders of a multi-cylinder engine preparatory to the injection of fuel thereinto under pressure and which engine is provided with a blower or the like supplying air to a plurality of cylinders all disposed to receive air from a common large volume air supply chamber and each of which is provided with a pair of oppositely cyclically moving pistons, which includes causing the air supply to undulate at all parts thereof simultaneously and at a frequency which is a multiple of the frequency of a piston cycle, suddenly exhausting a cylinder at one end, then suddenly admitting air of large volume from the undulating supply stream at a peak of the undulating pressure, at the other end of the cylinder and between the pistons, then successively discontinuing the exhaustion and admission and compressing the air in the cylinder between the pistons.

5. The method of scavenging and supercharging the cylinders of an internal combustion engine of the type provided with a blower supplying air to a large volume chamber disposed adjacent to all of the cylinders of the engine, which includes causing the air in the chamber to undulate at all parts thereof simultaneously and at a frequency which is a multiple of the frequency of a cylinder cycle, suddenly exhausting gases from one end of the cylinder until the remaining gases are at a minimum pressure, then suddenly admitting a large volume of air from the undulating supply at the peak of the undulating pressure while continuing the exhaustion, causing the exhaustion to be accelerated due to the combined pressure of the admitted air and kinetic energy of the outgoing gases, causing the air to be of sufficient volume to completely scavenge and fill the cylinder, successively discontinuing the exhaustion and admission operations and compressing until the air is compressed to fuel firing temperature.

6. The method of scavenging and supercharging the cylinders of an internal combustion engine of the type provided with a blower supplying air to a large volume chamber disposed adjacent to all of the cylinders of the engine, which includes causing the air in the chamber to undulate at all parts thereof simultaneously and at a frequency which is a multiple of the frequency of a cylinder cycle, suddenly exhausting gases from one end of the cylinder until the remaining gases are at a minimum pressure, then suddenly admitting a large volume of air from the undulating supply at the peak of undulating pressure while continuing the exhaustion, causing the air to be of sufficient volume to completely scavenge and fill the cylinder, successively discontinuing the exhaustion and admission operations and compressing until the air is compressed to fuel firing temperature.

7. The method of scavenging and supercharging the cylinders of a multi-cylinder internal combustion engine comprising providing a common supply of air at undulatory pressure disposed adjacent to all of the cylinders undulating at all parts thereof substantially simultaneously and at a frequency which is a multiple of the frequency of a cylinder cycle, suddenly exhausting gases from one end of the cylinder until the remaining gases are at a minimum pressure, then suddenly admitting a large volume of air from the undulating supply at the peak of the undulating pressure while continuing the exhaustion, causing the exhaustion to be accelerated due to the combined pressure of admitted air and kinetic energy of the outgoing gases, causing the air to be of sufficient volume to completely scavenge and fill the cylinder, successively discontinuing the exhaustion and admission operations and compressing until the air is compressed to fuel firing temperature.

8. The method of scavenging and supercharging the cylinders of a multi-cylinder internal combustion engine comprising providing a common supply of air at undulatory pressure disposed adjacent to all of the cylinders undulating at all parts thereof substantially simultaneously and at a frequency which is a multiple of the frequency of a cylinder cycle, suddenly exhausting gases from one end of the cylinder until the remaining gases are at a minimum pressure, then suddenly admitting a large volume of air from the undulating supply at the peak of the undulating pressure while continuing the exhaustion, causing the air to be of sufficient volume to completely scavenge and fill the cylinder, successively discontinuing the exhaustion and admission operations, and compressing until the air is compressed to fuel firing temperature.

FRANK BALLOU STEARNS.